(12) United States Patent
Vittur et al.

(10) Patent No.: US 11,098,243 B2
(45) Date of Patent: Aug. 24, 2021

(54) FREE-FLOWING SOLID ENCAPSULATED DRAG REDUCING ADDITIVES

(71) Applicants: Brandon Vittur, Sugar Land, TX (US); Anthony D. Bravo, Bixby, OK (US); Ross Poland, Terre Haute, IN (US)

(72) Inventors: Brandon Vittur, Sugar Land, TX (US); Anthony D. Bravo, Bixby, OK (US); Ross Poland, Terre Haute, IN (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 85 days.

(21) Appl. No.: 16/447,577

(22) Filed: Jun. 20, 2019

(65) Prior Publication Data

US 2019/0390107 A1 Dec. 26, 2019

Related U.S. Application Data

(60) Provisional application No. 62/687,323, filed on Jun. 20, 2018.

(51) Int. Cl.
*C09K 8/92* (2006.01)
*C08J 3/12* (2006.01)
*B02C 19/18* (2006.01)

(52) U.S. Cl.
CPC ............ *C09K 8/92* (2013.01); *B02C 19/186* (2013.01); *C08J 3/124* (2013.01); *C08J 3/126* (2013.01); *C08J 2323/20* (2013.01); *C08J 2323/24* (2013.01); *C08J 2423/06* (2013.01); *C08J 2423/08* (2013.01); *C08J 2425/06* (2013.01);
(Continued)

(58) Field of Classification Search
CPC ............... B02C 19/186; C08J 2323/20; C08J 2323/24; C08J 2423/06; C08J 2423/08; C08J 2425/06; C08J 2433/10; C08J 2467/00; C08J 2469/00; C08J 2477/00;
(Continued)

(56) References Cited

U.S. PATENT DOCUMENTS 4,584,244 A   4/1986 Fenton
4,693,321 A   9/1987 Royer
(Continued)

FOREIGN PATENT DOCUMENTS

WO   03004146 A1   1/2003
WO   03076482 A1   9/2003

OTHER PUBLICATIONS

International Search Report for International Application No. PCT/US2019/037058, International Filing Date Jun. 13, 2019, dated Oct. 1, 2019, 3 pages.
(Continued)

*Primary Examiner* — Frances Tischler
(74) *Attorney, Agent, or Firm* — Cantor Colburn LLP

(57) ABSTRACT

A process of manufacturing a free-flowing solid encapsulated drag reducing additive comprises: forming a solid drag reducing additive from one or more $C_{5-20}$ olefin monomers; dispersing the solid drag reducing additive in a liquid medium to form a dispersion, the liquid medium comprising an encapsulant and a non-solvent; grinding the solid drag reducing additive in the liquid medium under non-cryogenic grinding conditions to form an encapsulated drag reducing additive in a particulate form; and removing the non-solvent by a drying technique including spray drying, flash drying, or rotating disc drying to form the free-flowing solid encapsulated drag reducing additive.

18 Claims, 3 Drawing Sheets

(52) U.S. Cl.
CPC ........ *C08J 2433/10* (2013.01); *C08J 2467/00* (2013.01); *C08J 2469/00* (2013.01); *C08J 2477/00* (2013.01); *C09K 2208/28* (2013.01)

(58) Field of Classification Search
CPC ....... C08J 3/124; C08J 3/126; C09K 2208/28; C09K 8/035; C09K 8/92
See application file for complete search history.

(56) References Cited

U.S. PATENT DOCUMENTS

| | | |
|---|---|---|
| 5,244,937 A | 9/1993 | Lee et al. |
| 5,504,131 A | 4/1996 | Smith et al. |
| 5,504,132 A | 4/1996 | Smith et al. |
| 5,539,044 A | 7/1996 | Dindi et al. |
| 6,160,036 A | 12/2000 | Kommareddi et al. |
| 6,399,676 B1 | 6/2002 | Labude et al. |
| 6,649,670 B1 | 11/2003 | Harris et al. |
| 6,765,053 B2 | 7/2004 | Labude et al. |
| 6,841,593 B2 | 1/2005 | Kommareddi et al. |
| 6,946,500 B2 | 9/2005 | Harris et al. |
| 2003/0013783 A1 | 1/2003 | Kommareddi et al. |
| 2011/0319520 A1 | 12/2011 | Mathew et al. |

OTHER PUBLICATIONS

Patel et al. "Revealing facts behind spray dried solid dispersion technology used for solubility enhancement", Saudi Pharmaceutical Journal (2015) 23; pp. 352-365.

Written Opinion for International Application No. PCT/US2019/037058, International Filing Date Jun. 13, 2019, dated Oct. 1, 2019, 7 pages.

```
┌─────────────────────────┐
│  Produce Solid Drag Reducing │
│       Additive ("DRA")       │
└─────────────────────────┘
              │
              ▼
┌─────────────────────────┐
│ Disperse DRA in a non-solvent │
│ containing an encapsulant to  │
│      form a dispersion        │
└─────────────────────────┘
              │
              ▼
┌─────────────────────────┐
│  Grind DRA in the dispersion  │
│ under non-cryogenic conditions│
│   to form encapsulated DRA    │
└─────────────────────────┘
              │
              ▼
┌─────────────────────────┐
│    Remove the non-solvent     │
└─────────────────────────┘
```

FIG. 1

FREE-FLOWING SOLID ENCAPSULATED DRAG REDUCING ADDITIVES

CROSS REFERENCE TO RELATED APPLICATIONS

This application claims the benefit of U.S. Provisional Application Ser. No. 62/687,323, filed Jun. 20, 2018, the disclosure of which is incorporated herein by reference in its entirety.

BACKGROUND

Drag reducing agents are additives used in pipelines to increase the pipeline capacity by reducing turbulency. Effective drag reducing additives have a high molecular weight and are quick to dissolve in the fluid carried by the pipe. Polyolefins are drag reducing additives that are often used in the oil and gas industry. High molecular weight polyolefins can be made as blocks, then ground into small particles so that they can dissolve in hydrocarbons in an efficient manner. The ground polyolefins are typically stored and shipped as dispersions or slurries in water and/or organic non-solvents. However, non-solvents add cost to a drag reducing additive product without directly adding to or improving drag reduction performance. Water based products, while cheaper, cannot be added to finished fuel streams. Accordingly, there is a need in the art for alternative forms of drag reducing additives that can be conveniently and economically shipped, stored, and/or used.

BRIEF DESCRIPTION

In an embodiment, a process of manufacturing a free-flowing solid encapsulated drag reducing additive comprises: forming a solid drag reducing additive from one or more $C_{5-20}$ olefin monomers; dispersing the solid drag reducing additive in a liquid medium to form a dispersion, the liquid medium comprising an encapsulant and a non-solvent; grinding the solid drag reducing additive in the liquid medium under non-cryogenic conditions to form an encapsulated drag reducing additive in a particulate form; and removing the non-solvent by a drying technique including spray drying, flash drying, or rotating disc drying to form the free-flowing solid encapsulated drag reducing additive.

In another embodiment, a process of manufacturing a free-flowing solid encapsulated drag reducing additive comprises: forming a solid drag reducing additive from one or more $C_{5-20}$ olefin monomers; grinding the solid drag reducing additive in the presence of an encapsulant under cryogenic conditions to form an encapsulated drag reducing additive in a particulate form; dispersing the encapsulated drag reducing additive in a liquid medium to form a dispersion, the liquid medium comprising a non-solvent; and removing the non-solvent by a drying technique including spray drying, flash drying, or rotating disc drying to form the free-flowing solid encapsulated drag reducing additive.

An encapsulated free-flowing drag reducing additive comprises drag reducing additive particles coated with an encapsulant comprising a polyethylene homopolymer, a polyethylene copolymer, a poly-alpha-olefin derived from one or more $C_{2-4}$ monomers, a polyethylene glycol, a polypropylene glycol, am alcohol ethoxylate, an alcohol propoxylate, a polyacrylate, a polymethacrylate, a polystyrene, a polyester, a polycarbonate, a polyamide, alumina, silica, carbon black, calcined clays, talc, and metal stearates, or a combination comprising at least one of the foregoing, the drag reducing additive particles being derived from one or more $C_{5-20}$ olefin monomers, and the encapsulated free-flowing solid drag reducing additive having less than 1 wt. % of a non-solvent based on the total weight of the encapsulated free-flowing drag reducing additive.

BRIEF DESCRIPTION OF THE DRAWINGS

The following descriptions should not be considered limiting in any way. With reference to the accompanying drawings, like elements are numbered alike:

FIG. 1 is a flow chart showing an exemplary process for making free-flowing solid encapsulated drag reducing additives, where the drag reducing additives are encapsulated during a non-cryogenic grinding process;

DETAILED DESCRIPTION

Figure 2:
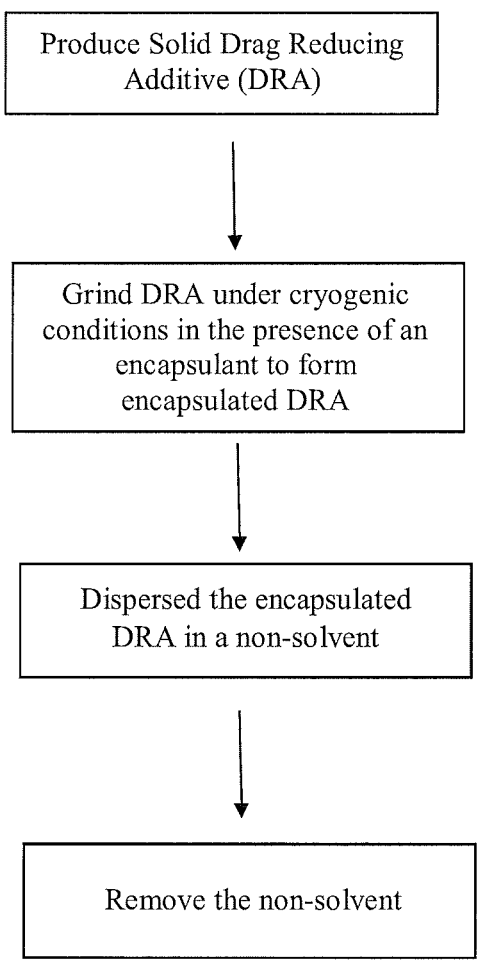
FIG. 2 is a flow chart showing an exemplary process for making free-flowing solid encapsulated drag reducing additives, where the drag reducing additives are encapsulated during a cryogenic grinding process.

Processes of manufacturing encapsulated free-flowing solid drag reducing additives are disclosed. The manufactured drag reducing additives can be transported directly without using any non-solvents, thus avoiding transporting hazardous materials and reducing material cost.

Referring to FIG. 1, in an embodiment, a process of making a free-flowing solid encapsulated drag reducing additive includes forming a solid drag reducing additive; dispersing the solid drag reducing additive in a liquid medium, which contains a non-solvent and an encapsulant, to form a dispersion; grinding the solid drag reducing additive in the dispersion under non-cryogenic grinding conditions to form an encapsulated particulate drag reducing additive; and removing the non-solvent by a drying technique to form the free-flowing encapsulated solid drag reducing additive.

Methods of making the solid drag reducing additives are not particularly limited. In an embodiment, a solid drag reducing additive is synthesized via a bulk polymerization process from one or more olefin monomers having 5 to 20 carbon atoms. As used herein, a bulk polymerization refers to a polymerization reaction that is carried out in the absence of any solvent or dispersant. Catalysts can be used. Exemplary catalysts include Ziegler-Natta catalysts as described in U.S. Pat. No. 6,649,670.

Alternatively, the drag reducing additive can be synthesized via a solution polymerization from one or more olefin monomers having 5 to 20 carbon atoms; and then precipitated out of the polymerization solvent to form a solid drag reducing additive.

If needed, the solid drag reducing additives, particularly high molecular weight solid drag reducing additives formed via bulk polymerization, are broken into smaller pieces for ease of handling. If a catalyst is used in the bulk polymerization, optionally, the catalyst can be deactivated in a blender by exposing the polymerization products to water, air, or a combination thereof.

The manufactured solid drag reducing additives, for example those that have been broken into smaller pieces, can be dispersed in a liquid medium, which contains a non-solvent and an encapsulant, forming a dispersion.

As used herein, a non-solvent refers to water or an alcohol that does not dissolve the drag reducing additive. Exemplary non-solvent alcohols include methanol; ethanol; an propyl alcohol; butanol; pentanol; hexanol; glycerol; ethylene glycol; propylene glycol; diethylene glycol; dipropylene glycol; or a methyl ether of a glycol; or a combination comprising at least one of the foregoing. More than one non-solvent can be used. In an embodiment, a dispersion that is subject to non-cryogenic grinding contains about 40 wt. % to about 90 wt. % of a non-solvent such as water based on the total weight of the dispersion.

Suitable encapsulant materials include polyethylene homopolymers or copolymers, poly-alpha-olefins derived from $C_{2-4}$ alpha olefin monomers, polyethylene glycol, polypropylene glycol, alcohol ethoxylates, alcohol propoxylates, polyacrylates, polymethacrylates, polystyrene, polyesters, polycarbonates, polyamides, alumina, silica, carbon black, calcined clays, talc, metal stearates, or a combination comprising at least one of the foregoing. Preferably, the encapsulant materials are those that have a melting point of less than about 100° C., specifically less than about 50° C. The glass transition temperature of the encapsulant materials is greater than about 15° C. or greater than about 40° C. so that the encapsulant remains rigid during use. The dispersion can contain about 30 wt. % to about 99 wt. % of the solid drag reducing additive, and about 70 wt. % to about 1 wt. % of the encapsulant, each based on the sum of the weight of the solid drag reducing additive and the encapsulant.

Optionally, the dispersion that is subject to non-cryogenic grinding also contains an additional non-agglomerating agent. Exemplary non-agglomerating agents include salts of fatty acids having 12-20 carbon atoms, specifically alkali earth metal salts of such acids, which may include, but are not limited to, magnesium stearate and calcium stearate, as well as polyethylene glycols, methoxylated polyethylene glycols, polyethylene waxes (Polywax), stearamide, ethylene-bis-stearamide, inorganic clays such as attapulgite and silicones, or a combination comprising at least one of the foregoing.

The dispersion can be fed into a grinding chamber where the solid drag reducing additive is ground at a non-cryogenic temperature. Solid and liquid grinding aids, such as those described in U.S. Pat. No. 6,946,500, can be used. As used herein, a cryogenic temperature refers to the glass transition temperature (Tg) of the particular drag reducing additive being ground, or below that temperature. A non-cryogenic temperature refers to a temperature that is above the cryogenic temperature for the particular drag reducing additive being ground. The non-cryogenic grinding forms a dispersion containing the non-solvent and an encapsulated particulate drag reducing additive. Without wishing to be bound by theory, it is believed that the encapsulant melts during grinding and encapsulates the ground drag reducing additive particulate. The encapsulated particulate drag reducing additive can be dried by a drying technique to remove the non-solvent in the dispersion produced from the non-cryogenic grinding thereby forming a free-flowing solid encapsulated drag reducing additive.

As shown in FIG. 2, in another embodiment, a process for making a free-flowing encapsulated solid drag reducing additive includes forming a solid drag reducing additive; grinding the solid drag reducing additive in the presence of an encapsulant under cryogenic grinding conditions to form an encapsulated particulate drag reducing additive; dispersing the encapsulated drag reducing additive in a non-solvent to form a dispersion; and removing the non-solvent by a drying technique to form the free-flowing encapsulated solid drag reducing additive.

To carry out cryogenic grinding, it is not necessary to form a dispersion first. Rather, the solid drag reducing additives manufactured via a bulk polymerization or a solution polymerization process as described herein are ground in the presence of an encapsulant at a cryogenic temperature to form encapsulated drag reducing additive particulates. The encapsulant used in a cryogenic grinding process can be the same as the encapsulant used in a non-cryogenic grinding process. The encapsulated drag reducing additive particulates formed after cryogenic grinding can be dispersed in a non-solvent as disclosed herein to form a dispersion. Non-agglomeration additives as disclosed herein can also be present in the dispersion.

The non-solvent in the dispersion produced from the non-cryogenic grinding or in the dispersion formed after cryogenic grinding can be removed by drying techniques such as spray drying, flash drying, or rotating disc drying. Advantageously, the drying techniques as disclosed herein produce free-flowing encapsulated drag reducing additives.

During a spray drying process, the dispersion containing the encapsulated drag reducing additive particulates is continuously fed into an operation unit, where it is divided into very fine droplets. The fine droplets are introduced into a compartment (drying chamber) where they come in contact with hot gas and get dried into fine particles. The fine particles can be further separated from the drying gas using a cyclone and/or a bag-filter. In an embodiment, the non-solvent is removed with a heated gas, which has an inlet temperature of about 50° C. to about 300° C. and an outlet temperature of about 25° C. to about 100° C. The inlet temperature refers to the temperature of the heated gas that is introduced to the drying chamber where the non-solvent is removed, and the outlet temperature refers to the temperature of the heated gas leaving the drying chamber. Exemplary heated gas includes heated air and a heated inert gas such as heated nitrogen, heated argon, and the like.

Flash drying is the process of drying the encapsulated drag reducing additive particulates by exposing a dispersion that contains the encapsulated drag reducing additive particulates briefly (typically a few seconds) to a high temperature gas stream, resulting in a rapid rate of evaporation without excessive heating of the encapsulated drag reducing additive particles. Rotating disc drying refers to a process that uses a rotating disc to divide the dispersion into fine drops before they meet a stream of hot gas.

After the non-solvent is removed, a free-flowing encapsulated solid drag reducing additive is obtained. The meaning of the term "free-flowing" is known to those skilled in the art and is used to describe particulate materials that can be poured without substantial clumping of the particles. As used herein, the phrase "free-flowing solid encapsulated drag reducing additive" refers to a solid encapsulated drag reducing additive that is not sticky, and thus has no or hardly any tendency to agglomerate or to adhere to contact surfaces.

The free-flowing additive contains drag reducing additive particles such as polyolefin particles coated with an encapsulant as disclosed herein where the encapsulated drag reducing additive has less than 1 wt. % or less than 0.5 wt. % of a non-solvent based on the total weight of the encapsulated drag reducing additive. The encapsulated polyolefin is amorphous and has a particle size of about 10 to about 2,000 microns, about 50 to about 2,000 microns, about 50 to about 1,500 microns, or about 75 to about 750 microns. A weight ratio of the drag reducing additive particles relative to the encapsulant is about 99:1 to about 7:3 or about 3:1 to about 5:1, for example about 4:1.

Figure 3:
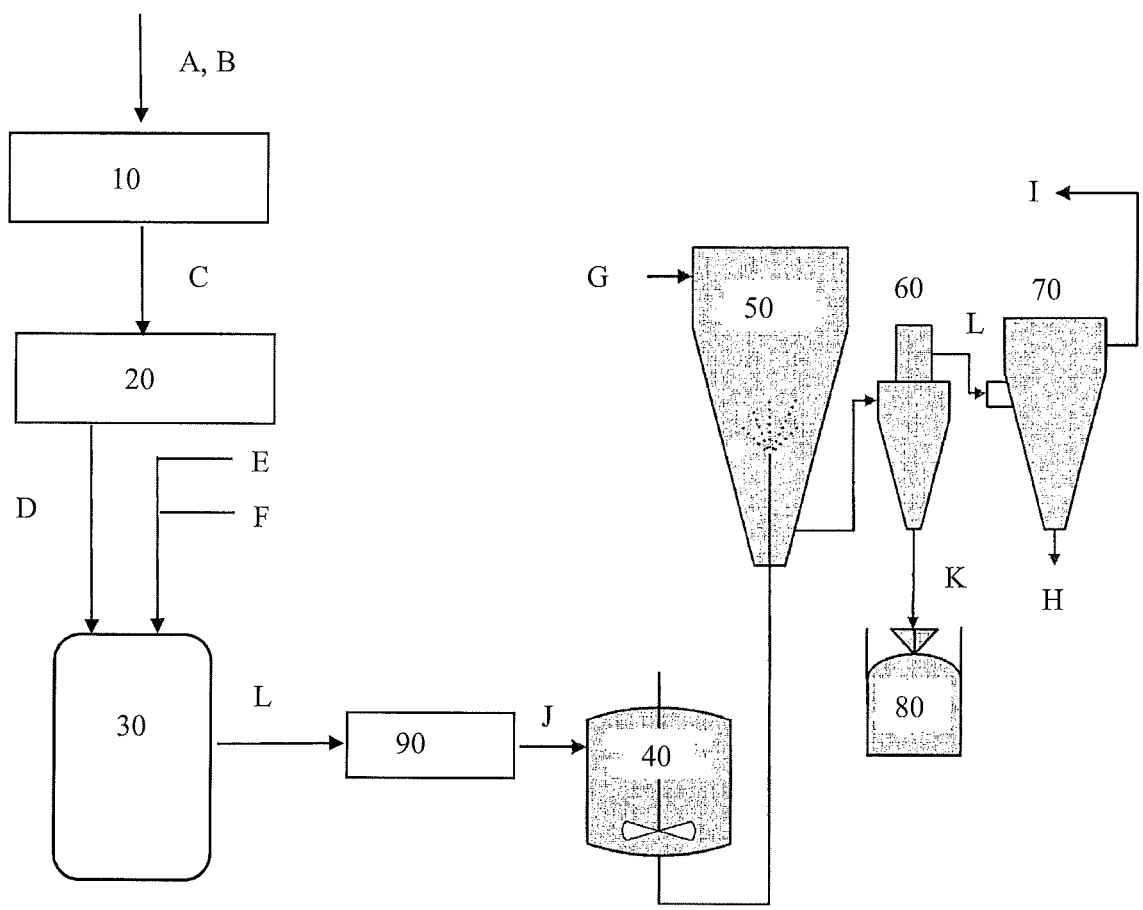
FIG. 3 illustrates an exemplary continuous process of manufacturing encapsulated free-flowing solid drag reducing additives.

The process can be a continuous process. Referring to FIG. 3, monomers (A) and catalysts (B) are introduced into a reactor (10), where a polymerization takes place forming drag reducing additive polyolefin (C). Although only one reactor is shown, it is appreciated that multiple reactors can be used, and suitable reactors include temporary containers formed of various polymers as disclosed, for example, in U.S. Pat. No. 6,649,670. The polyolefin (C) can be ground using a mill or blender (20) forming solids of reduced size (D). The polyolefin solids with reduced size (D) are introduced to tank (30), where an encapsulant (E), a non-solvent (F), and/or other additives are added forming a dispersion (L). The dispersion (L) is then introduced to mill (90) where the polyolefin solids are ground to polyolefin particles having a desired particle size at a non-cryogenic temperature. The dispersion (J) containing encapsulated polyolefin particles having the desired particle size is then introduced into a spray drier feed tank (40), where it is optionally heated and then fed into spray drier (50) in the form of small droplets using an atomizer or a spray nozzle. In the spray drier (50), the droplets come into contact with heated gas (G). The heated gas carries the small droplets into cyclone (60) where encapsulated free-flowing solid drag reducing additives (K) are formed and collected at container (80). The exhaust stream (L), which can contain non-solvent, gas, and fines, is fed to bag filter (70), where fines (H) are separated from the non-solvent (I).

Set forth below are various embodiments of the disclosure.

Embodiment 1

A process of manufacturing a free-flowing solid encapsulated drag reducing additive, the process comprising: forming a solid drag reducing additive from one or more $C_{5-20}$ olefin monomers; dispersing the solid drag reducing additive in a liquid medium to form a dispersion, the liquid medium comprising an encapsulant and a non-solvent; grinding the solid drag reducing additive in the liquid medium under non-cryogenic grinding conditions to form an encapsulated drag reducing additive in a particulate form; and removing the non-solvent by a drying technique including spray drying, flash drying, or rotating disc drying to form the free-flowing solid encapsulated drag reducing additive.

Embodiment 2

The process as in any prior embodiment, wherein the encapsulant comprises a polyethylene homopolymer, a polyethylene copolymer, a poly-alpha-olefin derived from one or more $C_{2-4}$ monomers, a polyethylene glycol, a polypropylene glycol, am alcohol ethoxylate, an alcohol propoxylate, a polyacrylate, a polymethacrylate, a polystyrene, a polyester, a polycarbonate, a polyamide, alumina, silica, carbon black, calcined clays, talc, and metal stearates, or a combination comprising at least one of the foregoing.

Embodiment 3

The process as in any prior embodiment, wherein the non-solvent comprises water, an alcohol, or a combination comprising at least one of the foregoing.

Embodiment 4

The process as in any prior embodiment, wherein the alcohol comprises one or more of the following: methanol; ethanol; an propyl alcohol; butanol; pentanol; hexanol; glycerol; ethylene glycol; propylene glycol; diethylene glycol; dipropylene glycol; or a methyl ether of a glycol.

Embodiment 5

The process as in any prior embodiment, wherein the dispersion comprises about 10 wt. % to about 60 wt. % of the drag reducing additive, and about 40 wt. % to about 90 wt. % of the non-solvent, which is water, each based on the total weight of the dispersion.

Embodiment 6

The process as in any prior embodiment, wherein the dispersion further comprises a non-agglomeration agent including a salt of fatty acids having 12-20 carbon atoms, a polyethylene glycol, a methoxylated polyethylene glycol, a polyethylene wax, stearamide, ethylene-bis-stearamide, an inorganic clay, a silicone, or a combination comprising at least one of the foregoing.

Embodiment 7

The process as in any prior embodiment, wherein the non-solvent is removed with a heated gas, the heated gas having an inlet temperature of about 50° C. to about 300° C. and an outlet temperature of about 25° C. to about 100° C.

Embodiment 8

The process as in any prior embodiment, further comprising synthesizing a drag reducing additive via bulk polymerization; and grinding the drag reducing additive to form the solid drag reducing additive.

Embodiment 9

The process as in any prior embodiment, further comprising synthesizing a drag reducing additive via solution polymerization; and precipitating the drag reducing additive to form the solid drag reducing additive.

Embodiment 10

The process as in any prior embodiment, wherein the encapsulated drag reducing additive has a particle size of about 10 to 2,000 microns.

Embodiment 11

The process as in any prior embodiment, wherein the free-flowing encapsulated solid drag reducing additive comprises less than 1 wt. % of the non-solvent based on the total weight of the free-flowing encapsulated solid drag reducing additive.

Embodiment 12

The process as in any prior embodiment, wherein the process is a continuous process.

Embodiment 13

A process of manufacturing a free-flowing solid encapsulated drag reducing additive, the process comprising: forming a solid drag reducing additive from one or more $C_{5-20}$ olefin monomers; grinding the solid drag reducing additive in the presence of an encapsulant under cryogenic grinding conditions to form an encapsulated drag reducing additive in a particulate form; dispersing the encapsulated drag reducing additive in a liquid medium to form a dispersion, the liquid medium comprising a non-solvent; and removing the non-solvent by a drying technique including spray drying, flash drying, or rotating disc drying to form the free-flowing solid encapsulated drag reducing additive.

Embodiment 14

The process as in any prior embodiment, wherein the encapsulant comprises a polyethylene homopolymer, a polyethylene copolymer, a poly-alpha-olefin derived from one or more $C_{2-4}$ monomers, a polyethylene glycol, a polypropylene glycol, am alcohol ethoxylate, an alcohol propoxylate, a polyacrylate, a polymethacrylate, a polystyrene, a polyester, a polycarbonate, a polyamide, alumina, silica, carbon black, calcined clays, talc, and metal stearates, or a combination comprising at least one of the foregoing.

Embodiment 15

The process as in any prior embodiment, wherein the non-solvent comprises water, an alcohol, or a combination comprising at least one of the foregoing.

Embodiment 16

The process as in any prior embodiment, wherein the dispersion further comprises a non-agglomeration agent including a salt of fatty acids having 12-20 carbon atoms, a polyethylene glycol, a methoxylated polyethylene glycol, a polyethylene wax, stearamide, ethylene-bis-stearamide, an inorganic clay, a silicone, or a combination comprising at least one of the foregoing.

Embodiment 17

The process as in any prior embodiment, wherein the non-solvent is removed with a heated gas, the heated gas having an inlet temperature of about 50° C. to about 300° C. and an outlet temperature of about 25° C. to about 100° C.

Embodiment 18

An encapsulated free-flowing drag reducing additive comprising: drag reducing additive particles coated with an encapsulant comprising a polyethylene homopolymer, a polyethylene copolymer, a poly-alpha-olefin derived from one or more $C_{2-4}$ monomers, a polyethylene glycol, a polypropylene glycol, am alcohol ethoxylate, an alcohol propoxylate, a polyacrylate, a polymethacrylate, a polystyrene, a polyester, a polycarbonate, a polyamide, alumina, silica, carbon black, calcined clays, talc, and metal stearates, or a combination comprising at least one of the foregoing, the drag reducing additive particles being derived from one or more $C_{5-20}$ olefin monomers, and the encapsulated free-flowing solid drag reducing additive having less than 1 wt. % of a non-solvent based on the total weight of the encapsulated free-flowing drag reducing additive.

Embodiment 19

The encapsulated free-flowing drag reducing additive as in any prior embodiment, wherein the encapsulated free-flowing drag reducing additive is amorphous and has a particle size of about 10 to about 2,000 microns.

Embodiment 20

The encapsulated free-flowing drag reducing additive as in any prior embodiment, wherein a weight ratio of the drag reducing additive particles relative to the encapsulant is about 99:1 to about 3:7.

All ranges disclosed herein are inclusive of the endpoints, and the endpoints are independently combinable with each other. As used herein, "combination" is inclusive of blends, mixtures, alloys, reaction products, and the like. All cited patents, patent applications, and other references are incorporated herein by reference in their entirety. However, if a term in the present application contradicts or conflicts with a term in the incorporated reference, the term from the present application takes precedence over the conflicting term from the incorporated reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

What is claimed is:

1. A process of manufacturing a free-flowing solid encapsulated drag reducing additive, the process comprising:
    forming a solid drag reducing additive from one or more $C_{5-20}$ olefin monomers;
    dispersing the solid drag reducing additive in a liquid medium to form a dispersion, the liquid medium comprising an encapsulant and a non-solvent;
    grinding the solid drag reducing additive in the liquid medium under non-cryogenic grinding conditions to form a second dispersion comprising encapsulated drag reducing additive particles;
    feeding the second dispersion comprising the encapsulated drag reducing additive particles into a spray dryer in a form of droplets using an atomizer or a spray nozzle;
    contacting the droplets with a heated gas; and
    removing the non-solvent to form the free-flowing solid encapsulated drag reducing additive, the heated gas having an inlet temperature of 50° C. to 300° C. and an outlet temperature of 25° C. to 100° C.

2. The process of claim 1, wherein the encapsulant comprises a polyethylene homopolymer, a polyethylene copolymer, a poly-alpha-olefin derived from one or more $C_{2-4}$ monomers, a polyethylene glycol, a polypropylene glycol, am alcohol ethoxylate, an alcohol propoxylate, a polyacrylate, a polymethacrylate, a polystyrene, a polyester, a polycarbonate, a polyamide, alumina, silica, carbon black, calcined clays, talc, and metal stearates, or a combination comprising at least one of the foregoing.

3. The process of claim 1, wherein the non-solvent comprises water, an alcohol, or a combination comprising at least one of the foregoing.

4. The process of claim 3, wherein the alcohol comprises one or more of the following: methanol; ethanol; a propyl alcohol; butanol;
pentanol; hexanol; glycerol; ethylene glycol; propylene glycol; diethylene glycol;
dipropylene glycol; or a methyl ether of a glycol.

5. The process of claim 1, wherein the dispersion comprises about 10 wt. % to about 60 wt. % of the drag reducing additive, and about 40 wt. % to about 90 wt. % of the non-solvent, which is water, each based on the total weight of the dispersion.

6. The process of claim 1, wherein the dispersion further comprises a non-agglomeration agent including a salt of fatty acids having 12-20 carbon atoms, a polyethylene glycol, a methoxylated polyethylene glycol, a polyethylene wax, stearamide, ethylene-bis-stearamide, an inorganic clay, a silicone, or a combination comprising at least one of the foregoing.

7. The process of claim 1, further comprising synthesizing a drag reducing additive via bulk polymerization; and grinding the drag reducing additive to form the solid drag reducing additive.

8. The process of claim 1, further comprising synthesizing a drag reducing additive via solution polymerization; and precipitating the drag reducing additive to form the solid drag reducing additive.

9. The process of claim 1, wherein the encapsulated drag reducing additive particles have a particle size of about 10 to 2,000 microns.

10. The process of claim 1, wherein the free-flowing solid encapsulated drag reducing additive comprises less than 1 wt. % of the non-solvent based on the total weight of the free-flowing solid encapsulated drag reducing additive.

11. The process of claim 1, wherein the process is a continuous process.

12. A process of manufacturing a free-flowing solid encapsulated drag reducing additive, the process comprising:
forming a solid drag reducing additive from one or more $C_{5-20}$ olefin monomers;
grinding the solid drag reducing additive in the presence of an encapsulant under cryogenic grinding conditions to form encapsulated drag reducing additive particles;
dispersing the encapsulated drag reducing additive particles in a liquid medium to form a dispersion, the liquid medium comprising a non-solvent;
feeding the dispersion comprising the encapsulated drag reducing additive particles into a spray dryer in a form of droplets using an atomizer or a spray nozzle;
contacting the droplets with a heated gas; and
removing the non-solvent by a drying technique including spray drying, flash drying, or rotating disc drying to form the free-flowing solid encapsulated drag reducing additive, the heated gas having an inlet temperature of 50° C. to 300° C. and an outlet temperature of 25° C. to 100° C.

13. The process of claim 12, wherein the encapsulant comprises a polyethylene homopolymer, a polyethylene copolymer, a poly-alpha-olefin derived from one or more $C_{2-4}$ monomers, a polyethylene glycol, a polypropylene glycol, am alcohol ethoxylate, an alcohol propoxylate, a polyacrylate, a polymethacrylate, a polystyrene, a polyester, a polycarbonate, a polyamide, alumina, silica, carbon black, calcined clays, talc, and metal stearates, or a combination comprising at least one of the foregoing.

14. The process of claim 12, wherein the non-solvent comprises water, an alcohol, or a combination comprising at least one of the foregoing.

15. The process of claim 12, wherein the dispersion further comprises a non-agglomeration agent including a salt of fatty acids having 12-20 carbon atoms, a polyethylene glycol, a methoxylated polyethylene glycol, a polyethylene wax, stearamide, ethylene-bis-stearamide, an inorganic clay, a silicone, or a combination comprising at least one of the foregoing.

16. The process of claim 1, wherein the free-flowing solid encapsulated drag reducing additive comprises less than 0.5 wt. % of the non-solvent based on the total weight of the free-flowing solid encapsulated drag reducing additive.

17. The process of claim 1, further comprising heating the second dispersion comprising the encapsulated drag reducing additive particles before feeding the second dispersion into the spray dryer.

18. The process of claim 17, wherein the encapsulated drag reducing additive particles have a particle size of about 75 to 750 microns, and a weight ratio of the solid drag reducing additive relative to the encapsulant in the encapsulated drag reducing additive particles is about 3:1 to about 5:1.

\* \* \* \* \*